(12) United States Patent
Warren

(10) Patent No.: US 6,675,284 B1
(45) Date of Patent: Jan. 6, 2004

(54) INTEGRATED CIRCUIT WITH MULTIPLE PROCESSING CORES

(75) Inventor: Robert Warren, Thornbury (GB)

(73) Assignee: STMicroelectronics Limited, Bristol (GB)

( * ) Notice: Subject to any disclaimer, the term of this patent is extended or adjusted under 35 U.S.C. 154(b) by 0 days.

(21) Appl. No.: 09/378,909

(22) Filed: Aug. 20, 1999

(30) Foreign Application Priority Data

Aug. 21, 1998 (GB) .............................. 9818377

(51) Int. Cl.[7] .............................. G06F 9/00; G06F 15/16
(52) U.S. Cl. ........................ 712/38; 709/250; 710/306
(58) Field of Search ........................ 709/250; 714/30, 714/718, 722; 712/227, 38; 710/306, 309

(56) References Cited

U.S. PATENT DOCUMENTS

| | | | | |
|---|---|---|---|---|
| 5,533,192 A | * | 7/1996 | Hawley et al. ................ | 714/28 |
| 5,732,209 A | * | 3/1998 | Vigil et al. .................... | 714/30 |
| 6,134,675 A | * | 10/2000 | Raina ........................... | 714/37 |
| 6,279,104 B1 | * | 8/2001 | Sato et al. ................... | 712/227 |
| 6,516,442 B1 | * | 2/2003 | Wang et al. ................. | 714/776 |

FOREIGN PATENT DOCUMENTS

| | | | |
|---|---|---|---|
| EP | 652516 | * | 5/1995 |
| EP | 840220 | * | 5/1995 |
| EP | 0 661 551 A2 | | 7/1995 |
| EP | 720092 | * | 7/1996 |
| EP | 0 840 217 A1 | | 5/1998 |
| EP | 840219 | * | 5/1998 |
| EP | 0 840 221 A1 | | 5/1998 |

OTHER PUBLICATIONS

"Common On–Chip Processor Switch for Multiprocessor System," *IBM Technical Disclosure Bulletin*, 37(4B):677–678, Apr. 1994.

Giorgio De Cari, "Tool Di Sviluppo Per DSP Multiprocessing," *Elettronica Oggi*, 225:103–107, Oct. 31, 1996.

* cited by examiner

*Primary Examiner*—Larry D. Donaghue
(74) *Attorney, Agent, or Firm*—Lisa K. Jorgenson; E. Russell Tarleton; Seed IP Law Group PLLC

(57) ABSTRACT

An integrated circuit having a serial data input pin and a serial data output pin, on-chip functional circuitry comprising at least two processing cores, a data adaptor which is in communication with the processing cores by respective communication channels and is connectable to the input and output pins. The data adaptor includes transmit circuitry, including circuitry for receiving parallel data and control signals from on-chip functional circuitry and circuitry for converting parallel data and control signals into a sequence of serial bits including flow control bits, data bits and channel identification bits that identify the communication channel on which parallel data and control signals were received. The adaptor further includes receive circuitry having circuitry for receiving from off-chip via the serial data input pin a sequence of serial bits including flow control bits, data bits and channel identification bits, circuitry for converting the bit sequence into parallel data and control signals for the on-chip functional circuitry and circuitry for transmitting parallel data and control signals on the communication channel identified by said channel identification bits.

23 Claims, 10 Drawing Sheets

INTEGRATED CIRCUIT WITH MULTIPLE PROCESSING CORES

TECHNICAL FIELD

This invention relates to an integrated circuit, and particularly an integrated circuit with multiple processing cores and which includes a test access port controller (TAP controller) for effecting communication of serial data across the chip boundary.

BACKGROUND OF THE INVENTION

Test access port controllers are known in the art. TAP controllers are used to effect communication of test data on and off chip via what is known as a JTAG port. The functions of known TAP controllers are defined by IEEE Standard 1149.1-1990. That Standard defines test logic which can be included in an integrated circuit to provide standardised approaches to testing the interconnections between integrated circuits, testing the integrated circuit itself, and observing or modifying circuit activities during the integrated circuit's "normal" or "user mode" operation.

According to the IEEE Standard, the TAP controller is capable of implementing a variety of different test modes. In each of these test modes, test data is supplied to the chip via an input pin of the TAP controller, and resultant data following the test is supplied off-chip via an output pin of the TAP controller. The resultant data is dependent on the test data and is compared with expected data to check the validity of the test. The input and output pins are referred to respectively as TDI and TDO. Many existing integrated circuits already incorporate a TAP controller of this type with the input and output pins TDI and TDO.

Our earlier patent application EP-A-0840217 describes a system which makes use of these pins and the TAP controller to increase the communication facilities of the integrated circuit without multiplexing the pins and thereby violating the standard.

This is particularly useful for diagnostic purposes. That is, where an integrated circuit includes embedded functional circuitry, for example a processor, it is very difficult using existing diagnostic techniques to provide real time non-intrusive monitoring of the functional circuitry. The functional circuitry need not be a processor but could be other functional circuitry, which might include a DMA (Direct Memory Access) engine, or on-chip cache.

In the past, processors (CPUs) were manufactured as a single chip, requiring off-chip access to all their ancillary circuitry, such as memory. As a result, they had a plurality of access pins so that information about the CPU, in particular memory addressing information, was in any event externally available from these access pins.

In addition to memory addressing information, it is useful to be able to obtain status information about the internal state of the processor to ascertain for example such events as interrupts, changes in streams of instructions, setting of flags in various status registers of the CPU, etc.

Nowadays, chips are more complex and contain multiple processing cores. This combined with the increasing complexity of software designed to run on integrated circuit CPUs make debugging and diagnosis more and more difficult.

The technique described in EP-A-0840217 provides a system which greatly simplifies debugging for an integrated circuit with an on-chip processor. However, when more than one independent processing core is integrated on a single chip, it is desirable to debug each core, preferably as independently as possible. Typically, debugging software which runs on a host and which controls the debugging process is different and independent for each target processing core. This is difficult to implement with the system described in EP-A-0840217 because all on and off-chip communications take place via the TAP controller which responds to instructions from a single source only. Thus, although the earlier system does allow for on-chip functionality which comprises more than one processing core, the problem of independence required between the diagnostic facilities for each core and the independence of communication between each diagnostic facility and the corresponding independent software module on the host is not addressed.

SUMMARY OF THE INVENTION

According to one aspect of the present invention there is provided an integrated circuit comprising:

a) a serial data input pin and a serial data output pin;
b) on-chip functional circuitry comprising at least two processing cores;
c) a data adaptor which is in communication with the processing cores by respective communication channels and is connectable to the input and output pins, wherein the data adaptor comprises:
   i) transmit circuitry including means for receiving parallel data and control signals from said on-chip functional circuitry, and
   ii) means for converting said parallel data and control signals into a sequence of serial bits including flow control bits, data bits and channel identification bits which identify the communication channel on which said parallel data and control signals were received, and
   iii) receive circuitry including means for receiving from off-chip via the serial data input pin a sequence of serial bits including flow control bits, data bits and channel identification bits,
   iv) means for converting said sequence into parallel data and control signals for said on-chip functional circuitry; and
   vi) means for transmitting said parallel data and control signals on the communication channel identified by said channel identification bits.

In the described embodiment the receive circuitry comprises decoding means for decoding an event sequence of said serial bits, said event sequence including said channel identification bits. The event sequence can comprise an event header constituting a data packet. The transmit circuitry can include an event generator which generates an event sequence of bits to identify the communication channel on which data is being transmitted. An event can be generated when the instant communication channel is switched to an alternative communication channel.

Each processing core preferably includes at least one autonomously operating processor. In addition, it can also include on-chip memory and a bus system for communicating with said on-chip memory and also possibly with off-chip memory. In addition, each processing core can include a message converter which formulates messages to be transmitted off-chip via the data adaptor and decodes messages which are received on-chip via the data adaptor.

In order to implement diagnostics, each processing core can comprise a set of registers holding information for diagnostic purposes, said registers being accessible from off-chip via the data adapter and the communication channel associated with that processing core. This allows simultaneous independent debugging of on-chip independent processing cores to be accomplished.

The integrated circuit can comprise a test access port controller connected to effect communication of serial data across the chip boundary via said input and output pins, the test access port controller being connectable to on-clip test logic in a first mode of operation and connectable to the data adaptor in a second mode of operation.

The invention also provides a number of different computer systems incorporating an integrated circuit as above defined. In one of those systems, two independently operating off-chip processors are connected to the chip by an off-chip host communications adaptor for independently debugging two on-chip processing cores.

In another system, an off-chip host processor has two independently running debugging applications which can communicate independently via an off-chip adaptor with two on-chip independent processing cores.

In another system, an off-chip host processor executes a debugging application with independently operable interface modules which can communicate independently with on-chip processing cores via an off-chip host adaptor.

The invention also provides a method of effecting communication of messages from one of a plurality of independent processing cores on an integrated circuit to an off-chip host processor, wherein:

a) said one independent processing core formulates a message including a message identifier denoting the nature of the message and a channel identifier denoting the communication channel by which the independent processing core seeks to communicate the message;

b) the message is communicated via the identified communication channel to a data adaptor which adapts the message into a format suitable for communication off-chip;

c) when an alternative independent processing core seeks to communicate a message, a new communication channel is identified for the alternative independent processing core and an event message is generated for transmission off-chip identifying the alternative communication channel.

For a better understanding of the present invention and to show how the same may be carried into effect, reference will now be made by way of example to the accompanying drawings, in which:

DETAILED DESCRIPTION OF THE INVENTION

Figure 1:
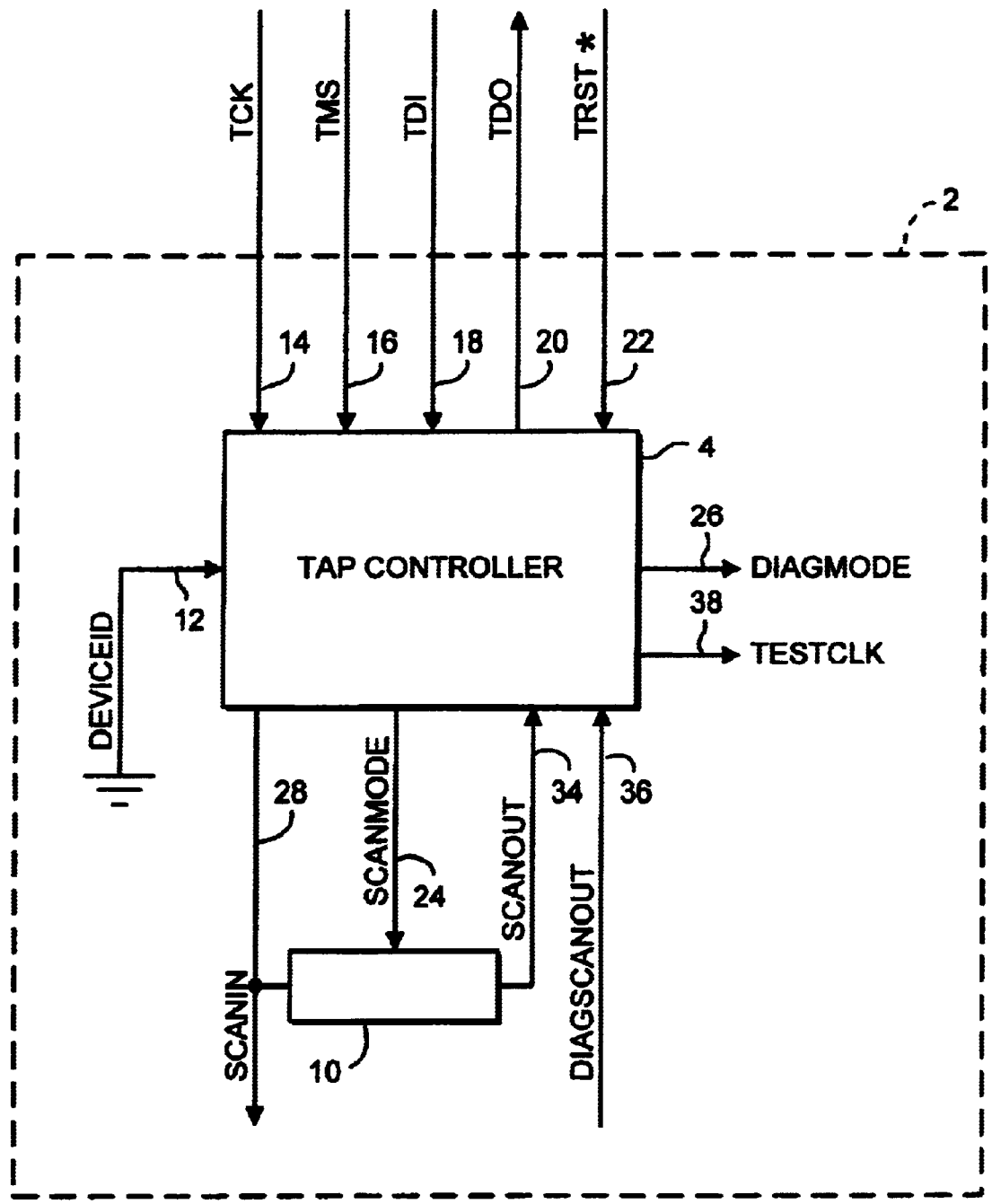
FIG. 1 illustrates an integrated circuit with a test access port controller having connections according to the described embodiment.

FIG. 1 illustrates schematically an integrated circuit 2 including a test access port (TAP) controller 4, and a chip boundary scan chain 10. The TAP controller 4 receives from off-chip a test clock signal TCK on line 14, a test mode select signal TMS on line 16, a test data input signal TDI on line 18, and a test reset input TRST* on line 22. The TAP controller 4 outputs off-chip a test data output signal TDO on line 20. The TAP controller 4 also receives a device identifier signal DEVICEID on line 12. In FIG. 1, the signal DEVICEID is shown as a signal line 12 connected, within the integrated circuit, to ground. The signal line 12 could be a multi-bit wire, and the signal DEVICEID could originate from either on the integrated circuit or off-chip. If the line 12 is a multi-bit wire, then each bit may be connected either to a logic low level or a logic high level on chip. The TAP controller 4 outputs to on-chip circuitry a scan data input signal, SCANIN on line 28, a test clock signal TESTCLK on line 38, a signal indicating selection of a scan test mode SCANMODE on line 24, and a signal indicating selection of a diagnostic mode DIAGMODE on line 26. The chip boundary scan chain 10 receives as inputs the scan data input signal SCANIN on line 28 and the signal SCANMODE on line 24, and outputs a scan data output SCANOUT on line 34 to the TAP controller 4. The signal SCANIN on line 28 also is connected to on-chip source/destination logic for diagnostic purposes according to the present invention and will be described hereafter. The source/destination logic provides an input signal DIAGSCANOUT to the TAP controller 4 on line 36 according to the present invention.

Figure 10:
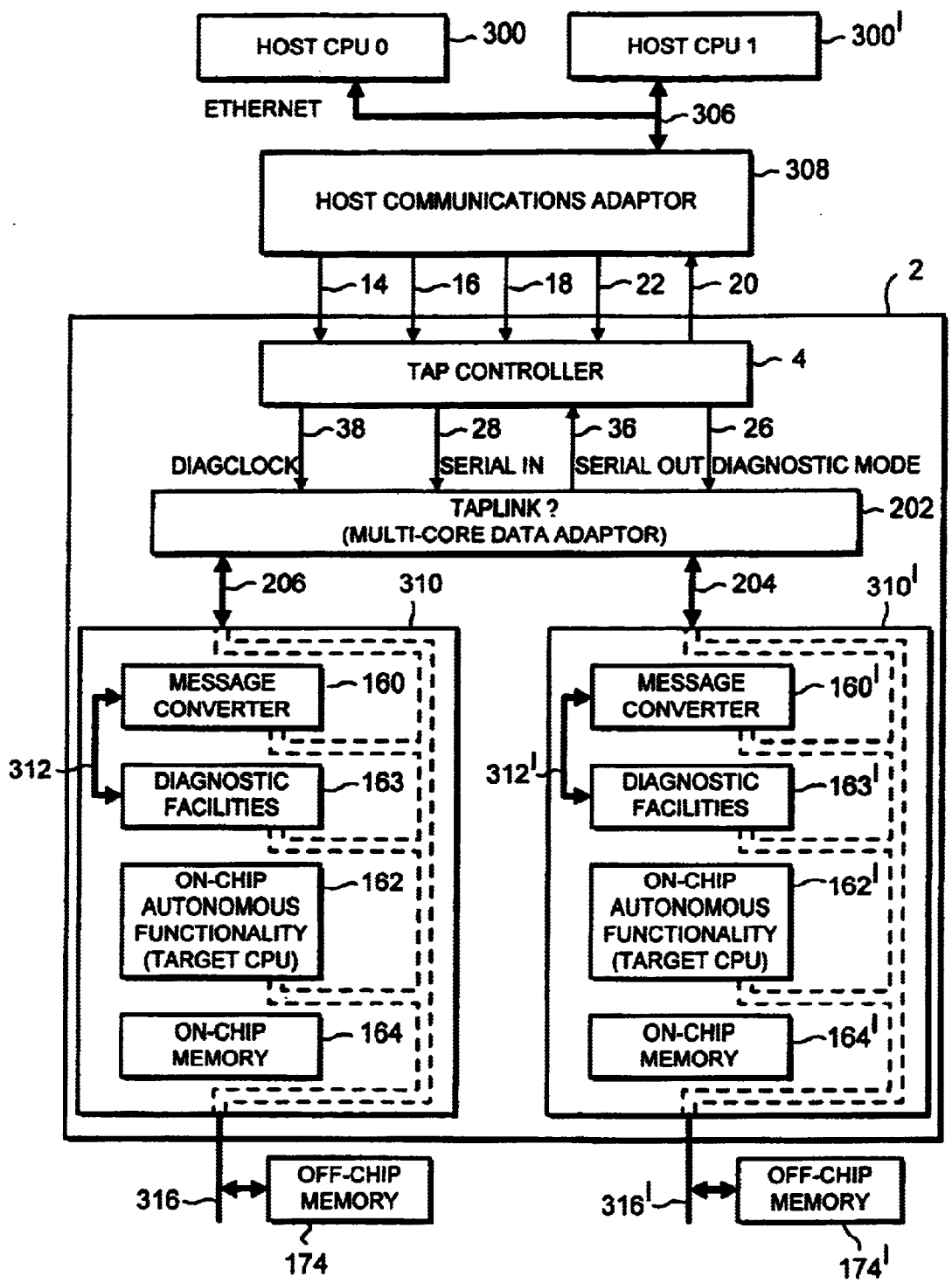
FIGS. 10 to 12 illustrate different environments utilizing the multi-core data adaptor.
Figure 11:
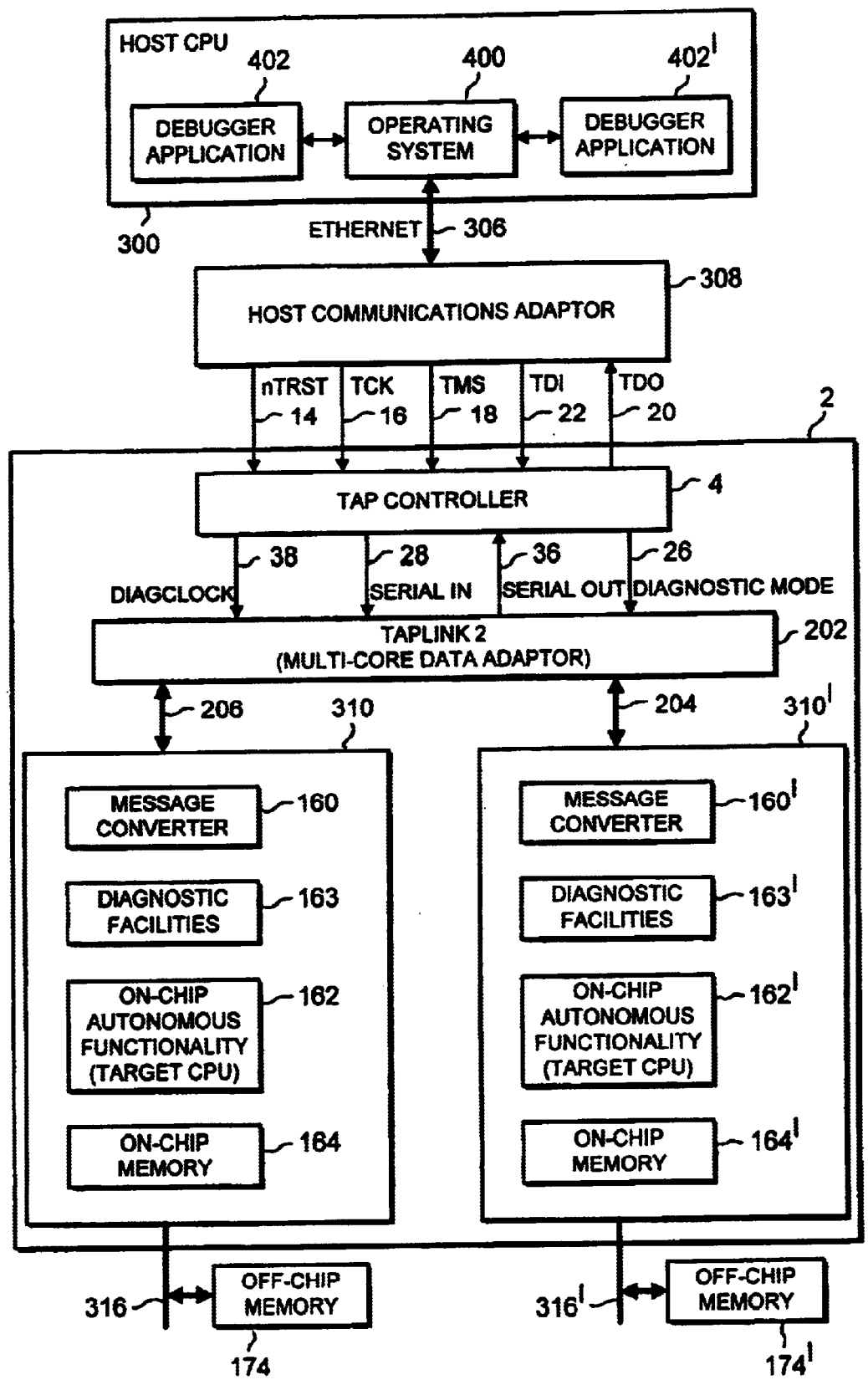
Figure 12:
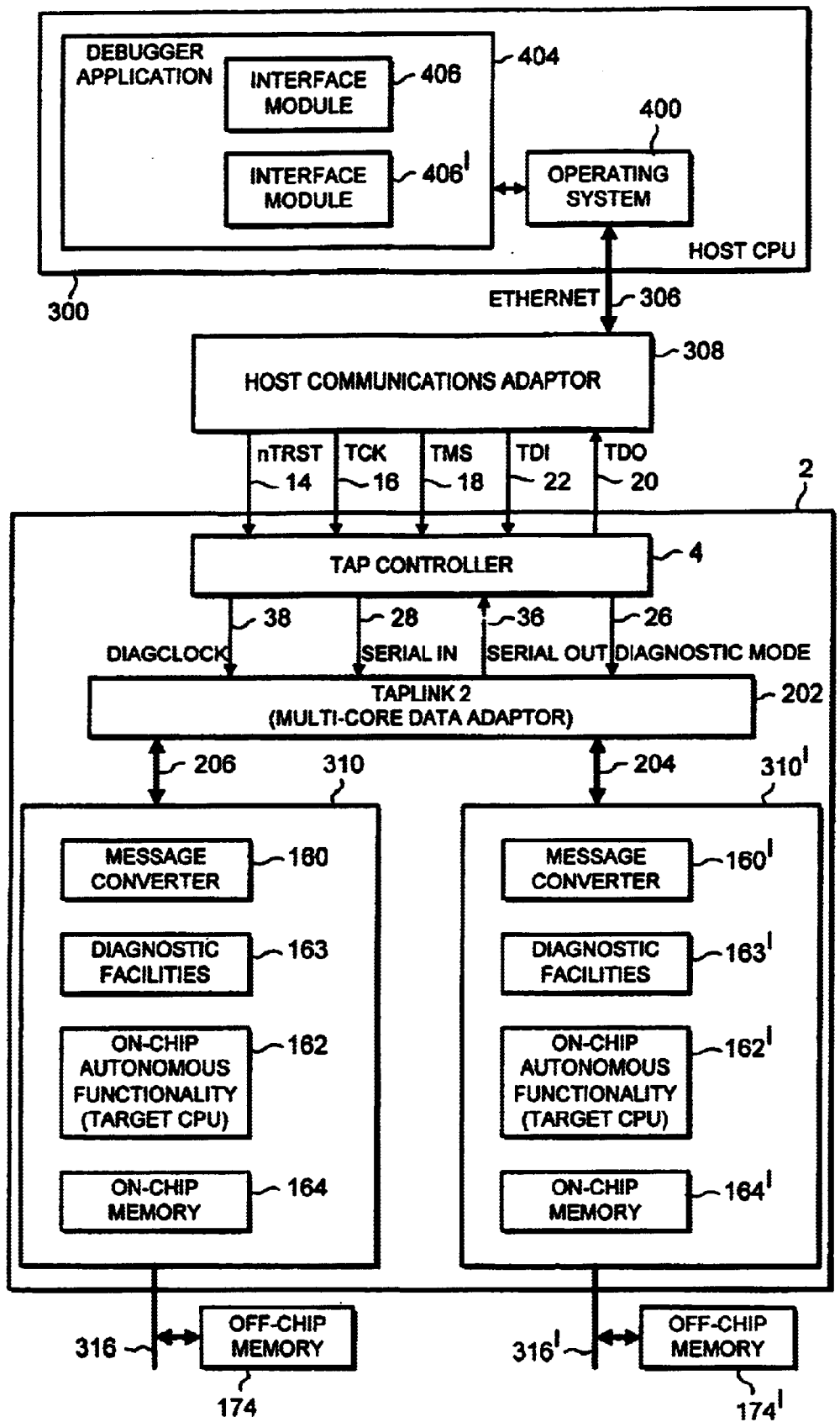

FIGS. 10 to 12, described in detail hereinbelow, illustrate the components that may constitute the source/destination logic. The source/destination logic may comprise at least two independent processing cores. Each processing core comprises a processor connected to an on-chip bus system having on-chip memory connected thereto. Off-chip memory may also be connected directly to each bus system. The on-chip destination/source logic may also include other functional circuitry such as a DMA engine or EMI interface.

Figure 2:
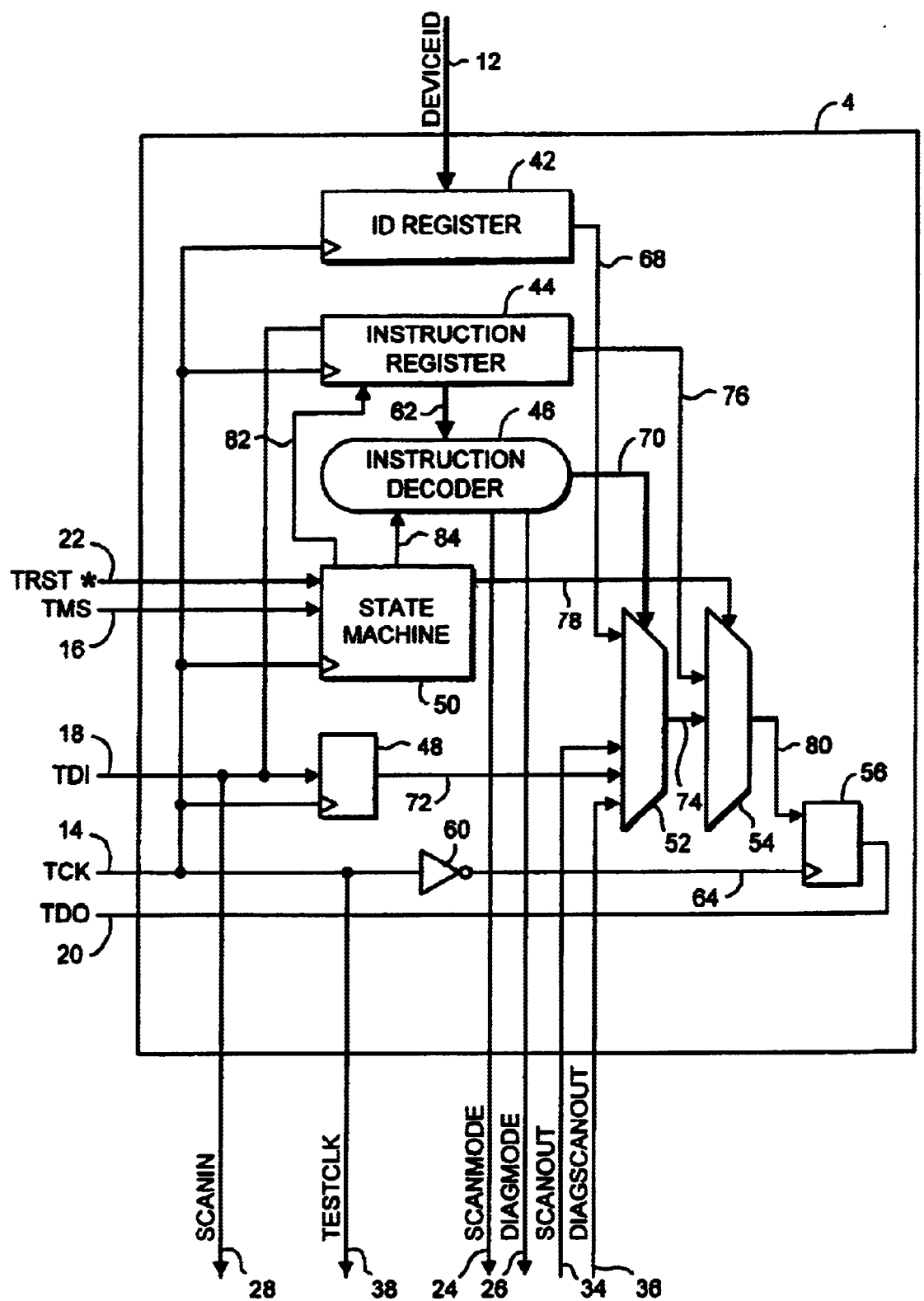
FIG. 2 illustrates the test access port controller of FIG. 1.

The TAP controller 4 is illustrated schematically in FIG. 2 with those circuit blocks essential to its standard operation and as required by the present invention. Referring to FIG. 2, the TAP controller 4, in basic form, comprises a state machine 50, an ID register 42, an instruction register 44, an instruction decoder 46, a bypass latch 48, a data multiplexor 52, an instruction/data multiplexor 54, a latch 56, and an inverter 60. The instruction register receives the test data input signal TDI on line 18, generates a parallel instruction on bus 62 and a serial output on line 76, and receives an instruction control input on line 82. The instruction decoder 46 receives the parallel instruction on bus 62 and a decoder control input on line 84, and generates the signals SCANMODE and DIAGMODE on lines 24 and 26 respectively, and a parallel data multiplexor select signal on line 70. The bypass latch 48 receives the test data input signal TDI on line 18 and generates an output on line 72. The ID register 42 receives the parallel signal DEVICEID on line 12 and generates a serial device identifier output on line 68. The data multiplexor 52 receives the output of the ID register 42 on line 68, the output of the bypass latch 48 on line 72, the SCANOUT signal on line 34, the DIAGSCANOUT signal on line 36 and the data multiplexor select signal on line 70. The data multiplexor 52 generates an output on line 74. The instruction/data multiplexor 54 receives the serial output on line 76, the output of the data multiplexor on line 74, and an instruction/data multiplexor select signal on line 78. The instruction/data multiplexor generates an output on line 80. The latch 56 receives the output of the instruction/data multiplexor 54 on line 80 and generates the test data output signal TDO on line 20. The state machine 50 receives the signal TMS on line 16, and the signal TRST* on line 22. The state machine generates the instruction/data multiplexor select signal on line 78, the instruction control input on line 82, and the decoder control input on line 84. The ID register 42, the instruction register 44, the instruction decoder 46, the bypass latch 48, the state machine 50, and the data converter 57 each receive the test clock signal TCK on line 14. The latch 56 receives the test clock signal TCK inverted via inverter 6G on line 64. The test clock signal TCK and the test data input signal TDI are connected directly as outputs TESTCLK on line 38 and SCANIN on line 28 respectively.

The operation of the TAP controller 4 in performing tests of the integrated circuit 2 is fully explained in IEEE 1149.1-1990. In essence finite length scan chains are formed on the integrated circuit such as that formed by chip boundary scan chain 10.

The TAP controller 4 is a synchronous finite state machine defined by IEEE Standard 1149.1-1990. IEEE Standard 1149.1-1990 defines test logic which can be included in an integrated circuit to provide standardised approaches to testing the interconnections between integrated circuits, testing the integrated circuit itself, and observing or modifying circuit activity during the integrated circuit's normal operation.

During normal operation of the integrated circuit 2, the TAP controller 2 is in a reset state, and all its inputs and outputs are inactive. When a test using the test access port according to IEEE Standard 1149.1-1990 is to be performed, the test access port controller operates according to the definitions of that standard. In such a test mode the test access port controller must be able to select at least one test mode of operation. One possible test mode is a scan test mode, which would be selected by setting the signal SCAN-MODE on line 24. In the scan test mode a scan chain on the integrated circuit 2 is selected for testing. In this example the chip boundary scan chain 10 is selected by the signal SCANMODE. Such a scan test may simply involve inputting data in at one end of the scan chain, and checking to see that the same data is output at the other end of the scan chain. Alternatively more complex scan operations may be performed, such as scanning in data which is input to functional logic on-chip, functionally clocking the chip for one or more clock cycles, and then scanning out the outputs of the functional logic. Any connection points or circuitry on-chip may be connected for test purposes to form a scan chain. The chip boundary scan chain 10 may be a series of flip-flops which are controlled in test mode to connect all the input/output ports of the integrated circuit 2. A full appreciation of such scan testing can be gathered from reference to IEEE Standard 1149.1-1990. For specific examples of how scan testing may be performed, reference should be made to European Patent Application Publication Nos. 0698890, 0702239, 0702240, 0702241, 0702242, 0702243, 0709688.

A characteristic of known test modes using the test access port of IEEE Standard 1149.1-1990 is that the scan chain is of finite length or closed loop, and that the test data output signal TDO is dependent on the test data input signal TDI, and has a time relationship therewith.

In the described embodiment, the diagnostic mode of operation is provided for carrying out diagnostic procedures of source/destination logic on-chip, which is compatible with IEEE Standard 1149.1-1990. In such a diagnostic test mode, the test data output signal TDO is not dependent on the test data input signal and does not have a time relationship therewith. The chain between the test data input signal TDI and the test data output signal TDO is considered to be of infinite length, or open loop. In the diagnostic mode the TAP controller, whilst continuing to provide all normal functionality, additionally acts as a transport agent carrying full duplex, flow-controlled, unbounded, serial data, although the TAP controller is unaware that this is the form of the data. Conversely the TAP controller normally handles a single stream of data, without any flow control, passing through a selected scan chain.

An overview of the operation of the TAP controller 4 in a test mode will now be given with reference to FIGS. 1 and 2. It should be pointed out that although in FIG. 2 it is shown that the signal SCANIN is connected directly to the test data input signal TDO, in certain circumstances SCANIN may be a modified version of TDI. Similarly although the test clock signal TESTCLK is connected directly to the test clock signal TCK, the signal TESTCLK may in certain circumstances be required to be a modified version of the signal TCK.

In a test mode of operation, the test data input signal TDI and the test mode select signal TMS are supplied in serial fashion to the TAP controller 4 under control of the test clock signal TCK. The state machine 50 acts upon the value of the test mode select signal TMS on each active edge of the test clock signal TCK to cycle through its states accordingly as defined by IEEE Standard 1149.1-1990. The test reset signal TRST* provides for asynchronous initialisation of the TAP controller 4 when in a low logic state in accordance with IEEE Standard 1149.1-1990.

The instruction register 44 is clocked by the test clock signal TCK to load an instruction in serial fashion from the test data input signal TDI under the control of the instruction control input signal on line 82 from the state machine 50 When the instruction has been serially loaded into the instruction register 44, it is transferred in parallel on instruction bus 62 to the instruction decoder 46 under control of the decoder control input signal on line 84 from the state machine 50. In accordance with the instruction stored therein, the instruction decoder will set one of either the SCANMODE signal or the DIAGMODE signal in accordance with whether it is a scan test or a diagnostic test which is to be performed. The loading of the instruction register 44 and the instruction decoder 46 are controlled by the state machine 50 in accordance with IEEE Standard 1149.1-1990. In accordance with the instruction decoded by the instruction decoder 46, and as described further hereinafter, the parallel output on line 70 of the instruction decoder 46 controls the data multiplexor 52 to connect one of its inputs to the output line 74. Similarly the output on line 78 of the state machine 50 controls the instruction/data multiplexor to connect one of its inputs to the output on line 80.

The ID register 42 receives the DEVICEID signal in parallel on lines 12. The ID register 42 stores a chip identifier which can be scanned out of the ID register 42 via line 68 to the test data output signal TDO. The chip identifier identifies the integrated circuit 2.

In one mode of operation the instruction decoded by the instruction decoder 46 may be simply to output the identity of the device, in which case the multiplexor 52 is controlled to connect its input on line 68 to its output on line 74, and the instruction/data multiplexor 54 is controlled to connect its input on line 74 to its output on line 80. The identity of the device is then serially output as the signal TDO.

In another mode of operation it may be required to output the current instruction on the test data output signal TDO, in which event the serial output on line 76 is connected by the instruction/data multiplexor 54 to the line 80.

In one mode of test operation, it may be required that the TAP controller 4 of a particular integrated circuit 2 merely connect the test data input signal TDI to the test data output signal TDO. In this mode of operation the data multiplexor is controlled to connect the output of the bypass flip-flop on line 72 to the output on line 74, and the instruction/data multiplexor is controlled to connect the line 74 to the output line 80. Thus the test data input signal TDI is connected to the test data output signal TDO via the flip-flop 56.

The latch 56 is merely a flip-flop provided only to allow timing control of the test data output signal TDO so that such signal can be synchronised to the negative edge of the test clock signal TCK.

If the test mode to be carried out is a scan test mode, then the instruction decoder 46 sets the signal SCANMODE. The data multiplexor 52 is controlled by the instruction decoder 46 to connect the signal SCANOUT to the output line 74. The instruction/data multiplexor 54 is also controlled to connect the line 74 to the line 80 so as to output the signal SCANOUT as the test data output signal TDO. During such a scan test mode test data is scanned into the selected scan chain on the SCANIN signal which is connected directly to the test data input signal TDI. Scan testing, in particular boundary scan testing, is fully described in IEEE Standard 1149.1-1990. It will be appreciated that additional control signals, in accordance with the test to be performed, need to be supplied to the selected scan chain to achieve the required test operation.

In the described embodiment a diagnostic mode may also be entered, in which case the instruction decoder 46 sets the signal DIAGMODE on the output line 26. Furthermore, the data multiplexor 52 will be controlled to connect the signal DIAGSCANOUT on line 36 to the output on line 74, which in turn is connected to the line 80 through the instruction/data multiplexor 54 and to the test data output signal TDO via the flip-flop 56.

In diagnostic mode, the serial data flow between the test data input signal TDI and the test data output signal TDO may be considered to pass through a shift register of infinite length as opposed to the scan test mode, in which mode the serial data flow is through a shift register (shift register chain) of finite length. In the diagnostic mode, a sequence of bit patterns shifted into the test access port as the test data input signal TDI are never reflected in the sequence of bit patterns shifted out of the test access port as the test data output signal. The communication of diagnostic data may include memory access requests from host to each target and each target to host (reads and writes); status information of CPU registers; data read from host memory or target memory in response to a memory access request; status data for loading into CPU registers; and information about memory addresses being accessed by each target CPUs. Thus the diagnostic mode may involve non-intrusive monitoring of data, or intrusive loading of data.

In the diagnostic mode the serial data shifted into the test access port is a uni-directional serial data stream which can be encoded in any desired means, for example, with start and stop bits to delineate data chunks. Likewise, data shifted out via the test access port is a uni-directional serial data stream which can be encoded in any desired means, for example with start and stop bits to delineate data chunks. Normally the data shifted in and the data shifted out will be encoded in the same way. The input and output uni-directional data streams may be used simultaneously to allow full-duplex, bidirectional, serial communications. The sequence of serial data bits could constitute a byte of information.

Figure 3:
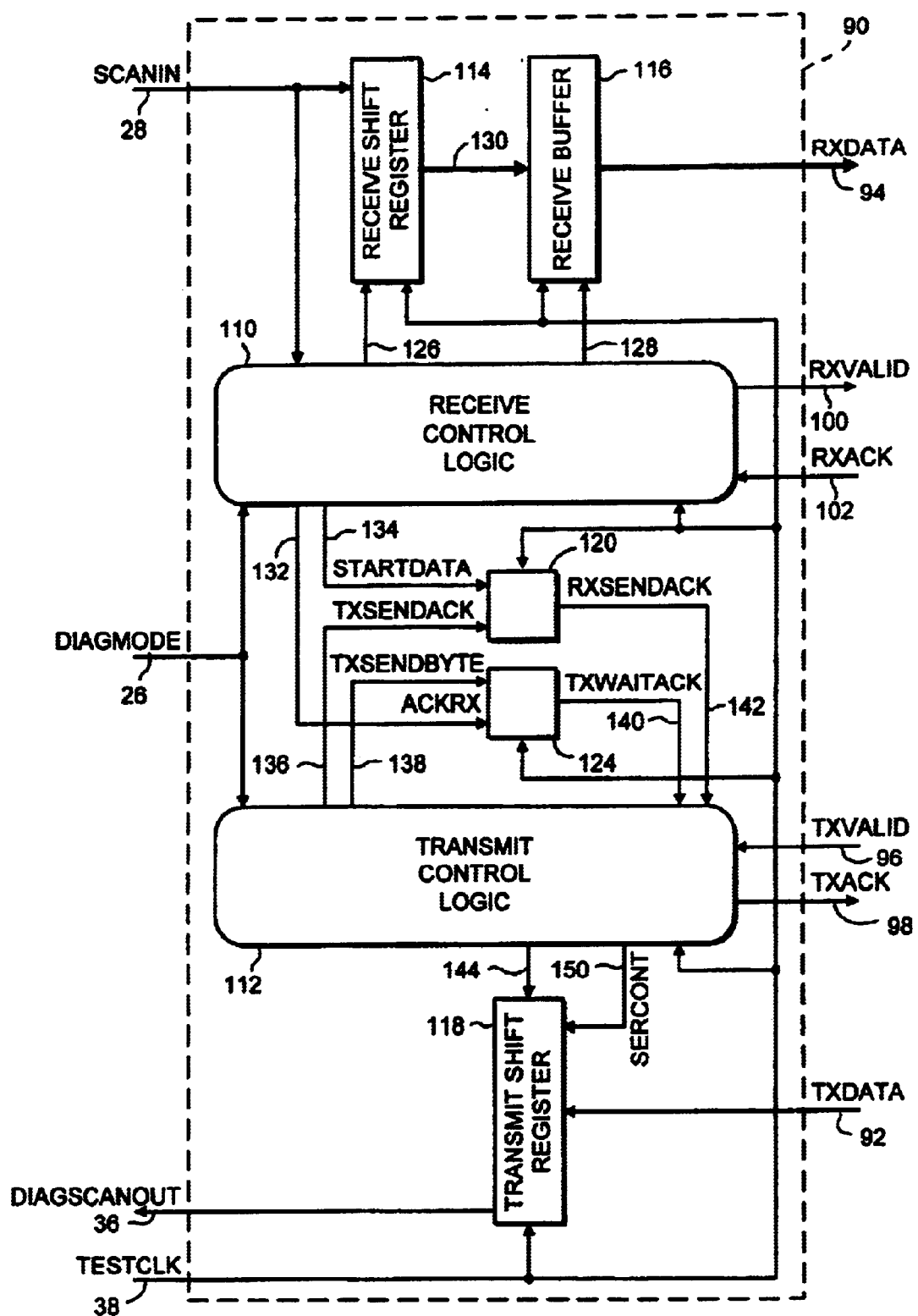
FIG. 3 illustrates a data adaptor according to the described embodiment for connection to the test access port controller of FIG. 2.

In the described embodiment, when provided with a diagnostic mode of operation in addition to a normal test mode, the integrated circuit 2 is provided, as shown in FIG. 3, with a data adaptor 90 to interface between the TAP controller 4 and on-chip source/destination logic. The data adaptor 90 receives as inputs from the TAP controller 4 the scan data input signal SCANIN on line 28, the test clock signal TESTCLK on line 38 and the signal indicating selection of the diagnostic mode DIAGMODE on time 26. The data adaptor 90 outputs to the TAP controller 4 the signal DIAGSCANOUT on line 36. The data adaptor receives data from on-chip source/destination logic on a transmit data bus TXDATA on line 92, and outputs data to on-chip source/destination logic on a receive data bus RXDATA on line 94. The data adaptor 90 inputs a transmit valid signal TXVALID on line 96, and outputs a transmit acknowledge signal TXACK on line 98, both of which signals are control signals associated with the transmit data bus TXDATA. The data adaptor 90 outputs a receive valid signal RXVALID on line 100 and inputs a receive acknowledge signal RXACK on line 102, both of which signals are control signals associated with the receive data bus RXDATA.

The data adaptor and its operation are first described herein as though the transmit and receive data buses 92,94 carry data to and from a single processing core connected to those buses. Subsequently, its modification for multiple processing cores will be described.

The data adaptor 90 comprises a receive shift register 114, a receive buffer 116, receive control logic 110, a receive flow control status flip-flop 120, a transmit flow control status flip-flop 124, a transmit shift register 118, and transmit control logic 112. The receive shift register 114 receives the signal SCANIN on line 28 and a control signal from the receive control logic on line 126, and outputs data in parallel on bus 130 to form an input to the receive buffer 116. The receive buffer additionally receives a control signal from the receive control logic on line 128 and generates the receive data bus signal RXDATA on line 94. The receive control logic additionally generates the signal RXVALID on line 100, receives the signal RXACK on line 102, receives the signal DIAGMODE on line 26, and generates signals STARTDATA and ACKRX on lines 134 and 132 respectively. The receive flow control status flip-flop 120 receives the signal STARTDATA and a signal TXSENDACK on line 136, and outputs a signal RXSENDACK to the transmit control logic on line 142. The transmit flow control status flip-flop 124 receives the signal ACKRX and a signal TXSENDBYTE on line 138, and outputs a signal TXWAITACK to the transmit control logic on line 140. The transmit control logic 112 additionally receives the signal DIAGMODE on line 26 and the signal TXVALID on line 96, and outputs the signal TXACK on line 98, a control signal to the transmit shift register 118 on line 144, and a parallel signal SERCONT to the transmit shift register 118. The transmit shift register 118 additionally receives the parallel data bus TXDATA on lines 92, and outputs the signal DIAGSCANCUT on line 36.

The data adaptor may optionally be provided with an input from the on-chip system clock, although this connection is not shown in any of the figures. The system clock may be used for synchronous implementations where the data and control signals between the data adaptor and the on-chip destination/source logic must be synchronous with the clock of the on-chip destination/source logic. The data adaptor 90 performs sychronization of serial data from the TAP controller clocked by the signal TESTCLK (derived from the signal TCK) to the clock environment of the internal functionality of the destination/source logic, and to the TAP controller clocked by the signal TESTCLK from the clock environment of the internal destination/source logic. The TAP controller 4 may optionally provide a scan enable signal to the data adaptor 90, which signal is also not shown in the figures. Such a scan enable signal indicates that the TAP controller has selected this scan path for data output onto the test data output signal TDC.

The data adaptor converts the uni-directional serial data from off-chip through the TAP controller 2 into a format more suited for use by the on-chip destination/source logic. Conversely the data adaptor must convert the data format supplied by the on-chip destination/source logic into unidirectional serial data. In the preferred embodiment, it is desired to provide data to the on-chip destination/source logic in the form of eight parallel bits, or a byte, of data. However, in the extreme the receive data bus RXDATA and the transmit data bus TXBUS could be only one bit, rather than a byte, wide. It s also envisaged that the receive and transmit data buses RXBUS and TXBUS could be multiple byte wide buses.

The data adaptor 90 must perform the function of "flow control" of both receive and transmit data. Serial data may only be passed through the TAP controller 4 (in either direction) when the receiving end has capacity available to receive that data to prevent data loss or corruption. The communication of the fact that the receiving end is ready to receive more data is achieved by transmitting such information in the reverse direction. This constitutes the flow control protocol. The data adaptor 90 according to the described embodiment provides for the unidirectional serial data to be converted into parallel format for communication with the on-chip destinaton./source logic. Thus a flow control protocol is also necessary between the data adaptor 90 and the on-chip destination/source logic.

This flow control must thus be performed across two boundaries: the boundary between the TAP controller 4 and the data adaptor 90; and the boundary between the data adaptor 90 and the on-chip destination/source logic to which the data adaptor 90 interfaces.

To provide flow control between the TAP controller 4 and the data adaptor 90 the unidirectional data on the test data input signal TDI line and the test data output signal line are encoded with start and stop bits as shown in FIG. 4(a). The bit flow control protocol is return to zero (RTZ) signalling with two start bits S1 and S2, and a stop bit E1. In between the start bits and the stop bit is included a byte of data. Serial data in this format is passed from the test data input TDI of the TAP controller to the SCANIN signal on line 28 and input to the data adaptor 90. The receive control logic 110 of the data adaptor receives the serial data signal SCANIN. When the receive control signal recognizes two successive serial bits as being the start bits S1 and S2, the receive shift register 114 is controlled on the line 126 to serially load the next eight successive bits, which form a data byte, therein.

In response to the two consecutive start bits S1 and S2, the receive control logic 110 also sets the signal STARTDATA on line 134, which sets the receive flow control status flip-flop 120. When set, the receive flow control status flip-flop 120 in turn sets the signal RXSENDACK on line 142, which signal causes the transmit control logic 112 to send an acknowledgement signal on the test data output signal TDO in the form shown in FIG. 4 (b), which signal comprises only a start acknowledge bit ACK and a stop bit E1. These bits are loaded directly into the transmit shift register in parallel as the signal SERCONT on line 150 under the control of the signal on line 144, and output from the transmit shift register in serial fashion in the form of FIG. 4(b), as the signal DIAGSCMIOUT. Once the acknowledgement signal has been sent, the transmit control logic 112 sets the signal TXSENDACK on line 136 to reset the receive flow control status flip-flop and thereby reset the signal RXSENDACK.

The signal SERCONT, in accordance with the flow control protocol used in this embodiment, is a 3 bit signal which enables the start bits S1,S2 and the stop bit E1 to be loaded directly into the transmit shift register 118. When a byte of data is presented by the on-chip destination logic, to be output through the TAP controller 4, is present on the transmit data bus TXDATA it is loaded in parallel under the control of the transmit control logic 112 into the transmit shift register 118, and the transmit control logic 112 directly loads the start bits S1,S2 and the stop bit E1 forming signal SERCONT into the appropriate bit positions in the transmit shift register prior to serially shifting a signal in the format shown in FIG. 4 (a). When sending an acknowledgement signal the transmit control logic 118 directly loads a single start bit and a stop bit into the transmit shift register, and then serially shifts them out.

When the receive control logic 110 receives the stop bit E1 on the signal SCANIN, the data byte has been loaded into the receive shift register 114, and under the control of the receive control logic 110 the data byte is transferred on bus 120 from the receive shift register 114 to the receive buffer 116. When a data byte has been loaded into the receive buffer 116 if is output on the bus RXDATA under control of the receive logic 110, which also sets the signal RXVALID on line 100. The destination/source logic on-chip, responsive to the signal RXVALID, accepts the data byte on the RXBUS and indicates this acceptance by setting the signal RXACK on line 102. In response to the signal RXACK the receive control logic 110 resets the signal RXVALID, and if there is a further data byte in the receive shift register 114 transfers this to the receive buffer 116 before again setting the signal RXVALID.

The receive buffer 116 is provided in the preferred embodiment. This allows acknowledge tokens, which overlap the reception of data, to be transmitted as soon as the two start bits have been received, and this also supports efficient data transfer rates by allowing successive bytes to be transferred without any gap between each byte. Data buffering may also be provided on the transmit side.

The destination/source logic on-chip transfers data bytes in parallel to the data adaptor 90 on the TXDATA bus 92. When the destination/source logic on-chip has a byte of data to be transmitted, the signal TXVALID on line 96 is set. In response to the signal TXVALID being set, the transmit control logic controls the transmit shift register 118 via line 144 to load the data byte on the TXDATA bus in parallel. In addition, using lines 150 the transmit control logic loads the appropriate start bits S1 and S2 and the stop bit E1 into the transmit shift register 118. Then, again under the control of the signal 144, the data byte including two start bits and a stop bit is serially shifted out of the transmit shift register as signal DIAGSCANOUT, which is connected through the TAP controller to the signal TDO. When the data byte on the bus TXDATA is loaded into the shift register, the transmit control logic sets the signal TXACK on line 98 to acknowledge receipt of tire data byte to the destination logic on-chip. The destination logic on-chip can then transmit a further byte of data. Data buffering may be provided in association with the transmit shift register if desired.

Figure 4:
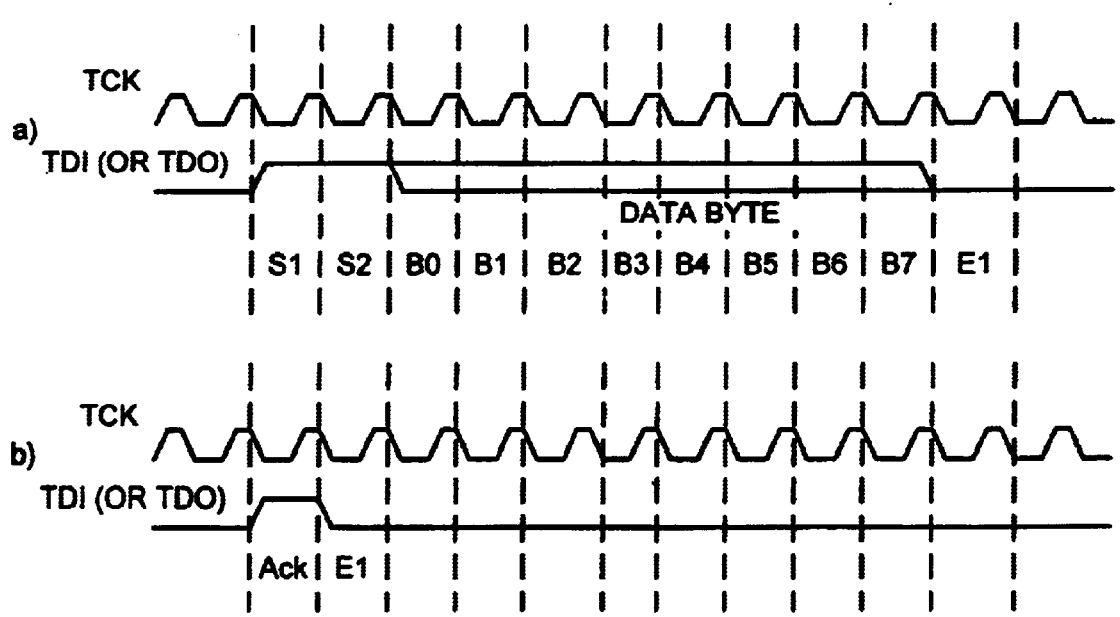
FIG. 4 illustrates the data format for data communicated off-chip via the test access port controller of FIG. 2 in a diagnostic mode.

When the transmit shift register 118 is controlled by the transmit control logic 112 to output serial data in the form shown in FIG. 4(*a*), the transmit control logic 112 also sets the signal TXSENDBYTE on line 138, which sets the transmit flow control status flip-flop 124. In response to this signal, the transmit flow control status flip-flop 124 sets the signal TXWAITACK on line 140. Whilst the TXWAITACK signal is set, the transmit control logic is waiting for an acknowledgement from the destination/source logic off-chip that the data byte set has been received. If the destination/source logic off-chip successfully receives the transmitted data byte than it sends on the test data input signal TDI an acknowledgement signal of the type shown in FIG. 4(*b*). Upon receipt of such an acknowledgement signal as the SCANIN signal on line 28, the receive control logic 110 will set the signal ACKRX on line 132, causing the transmit flow control status flip-flop 124, and consequently the signal TXWAITACK, to be reset. The transmit control logic 112 is then prepared to receive and transmit the next parallel data byte from the source/destination logic on-chip.

Figure 5:
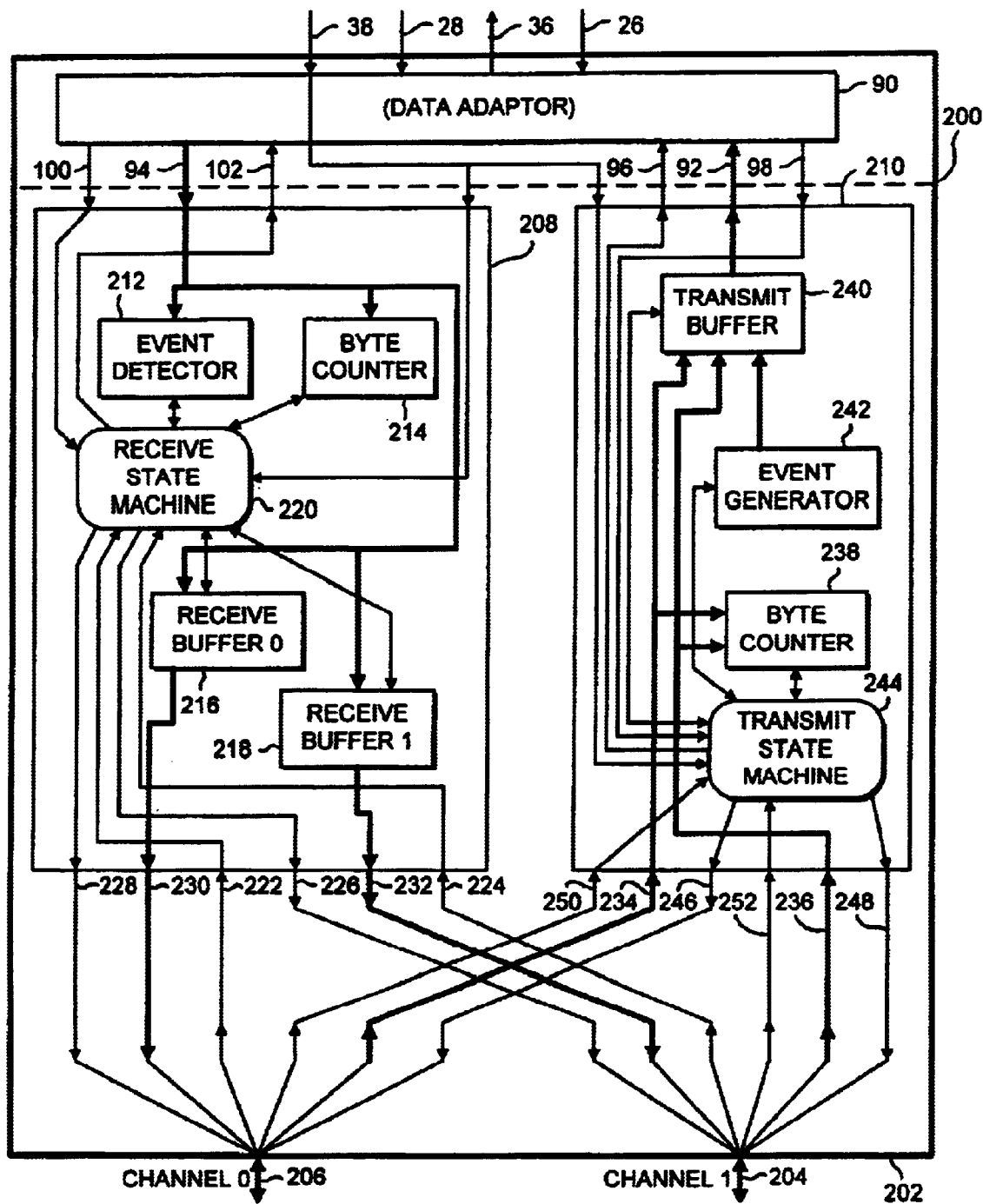
FIG. 5 illustrates a block diagram of a multi-core data adaptor.
Figure 9:
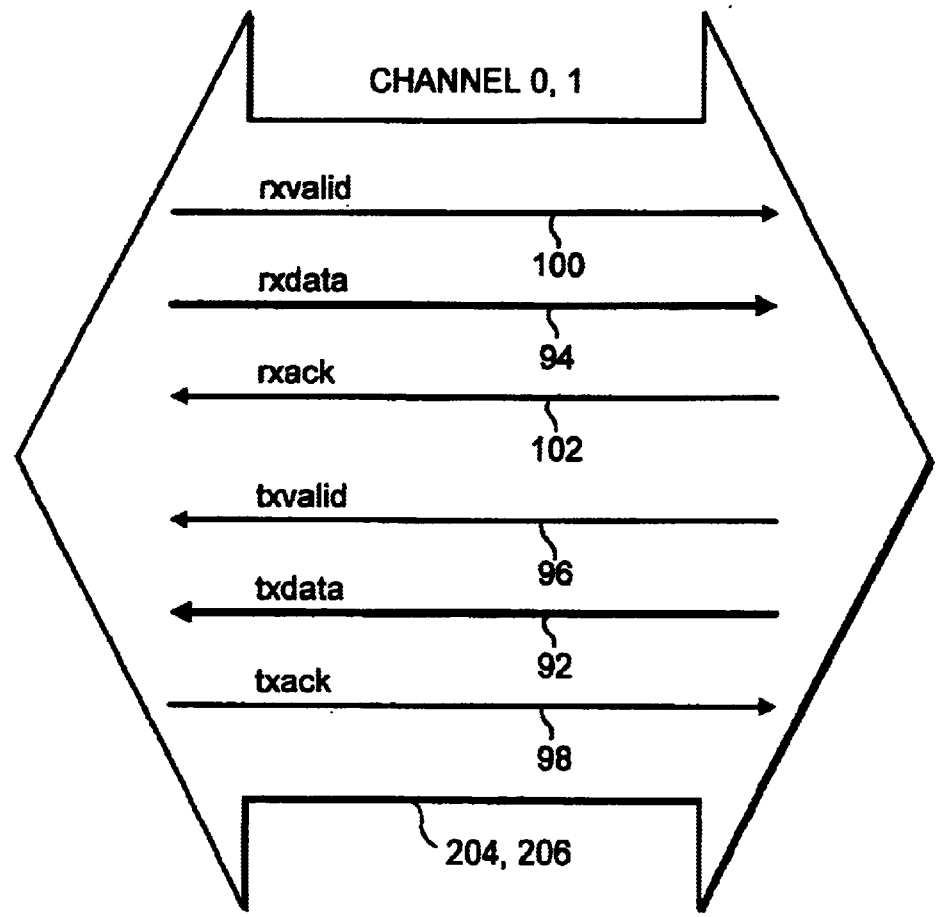
FIG. 9 illustrates the configuration of a communication channel on-chip.

FIG. 5 illustrates a multi-core data adaptor which includes a data adaptor 90 as has already been described, with additional circuitry 200 to render the adaptor suitable for performing independent communication between an off-chip host and more than one on-chip processing core. Communication between the multi-core data adaptor 202 and on-chip functional circuitry is implemented by a plurality of channels, of which two are illustrated in FIG. 5, marked Channel 1 and Channel 0, 204,206. Each channel has the format illustrated ill FIG. 9. The reference numerals used in FIG. 9 map the transmit and receive data streams into and out of the data adaptor. Different reference numerals are used in FIG. 5 for the same paths/control signals in the different channels. Thus, the RXDATA stream 94 in channel 0 is labelled 230 and in channel 1 is labelled 232. Reference numerals 228 and 226 denote the RXVALID signal 100, and reference numerals 222 and 224 denote the RXACK signal 102. Reference numerals 250 and 252 denote the TXVALID signal 96, and reference numerals 246 and 248 denote the TXACK signal 98.

The additional circuitry 200 comprises a receive demultiplexor 208 and a transmit multiplexor 210. The receive demultiplexor 208 passes the received data stream RXDATA 94 to the appropriate channel together with its corresponding incoming control signal 100. The receive demultiplexor comprises an event detector 212, byte counter 214, and first and second receive buffers 216,218 connected to receive the data stream RXDATA 94. A receive state machine 220 receives the incoming control signal 100 and the TAP clock 38. It generates the outgoing stream control signal 102 associated with the data stream RXDATA 94 to the data adaptor 90.

In addition, the receive state machine 220 receives information from, and controls, the event detector 212, byte counter 214 and the first and second receive buffers 216,218. It also receives the incoming control signals from the communication channels 204,206 along lines 222,224. These control signals are the receive acknowledge signals for the data stream RXDATA 94, equivalent to signal 102. In addition, the receive state machine generates the receive valid signal equivalent to signal 100 for communication via the first and second channels 204,206 on lines 226 and 228.

The first buffer 216 is connected to a receive data path 230 for communicating receive data via the first channel 206. The second buffer 218 is connected to a receive data path 232 for communicating data via the second channel 204.

The transmit multiplexor 210 receives transmit data TXDATA from the first and second channels 206,204 via respective transmit data paths 234,236. The transmit data paths 234,236 communicate with a byte counter 238 and a transmit buffer 240 which is connected to the transmit stream data path 92 to the data adaptor 90. The transmit multiplexor also comprises an event generator 242 and a transmit state machine 244. The transmit state machine 244 generates the transmit valid control signal 96 and transmit acknowledge signals 246,248 associated with each of the transmit data paths 234,236. The transmit state machine 244 receives incoming transmit valid control signals on lines 250,252 associated with the transmit in channels 0 and 1 respectively. The transmit state machine 244 also receives the transmit acknowledge control signal 98 associated with the transmit stream TXDATA 92. In addition, the transmit state machine receives information from, and controls, the byte counter 238, event generator 242 and transmit buffer 240.

In order to understand operation of the receive demultiplexor 208 and transmit multiplexor 210, it is necessary to understand the protocol by which data is communicated. In the described embodiment, each message is a packet consisting of a plurality of bytes. As has been described, the data adaptor 90 of the multi-core data adaptor 202 converts incoming serial data into parallel bytes, and converts outgoing parallel bytes into serial data. The protocol will now be described with reference to FIGS. 6 and 7.

Figure 6:
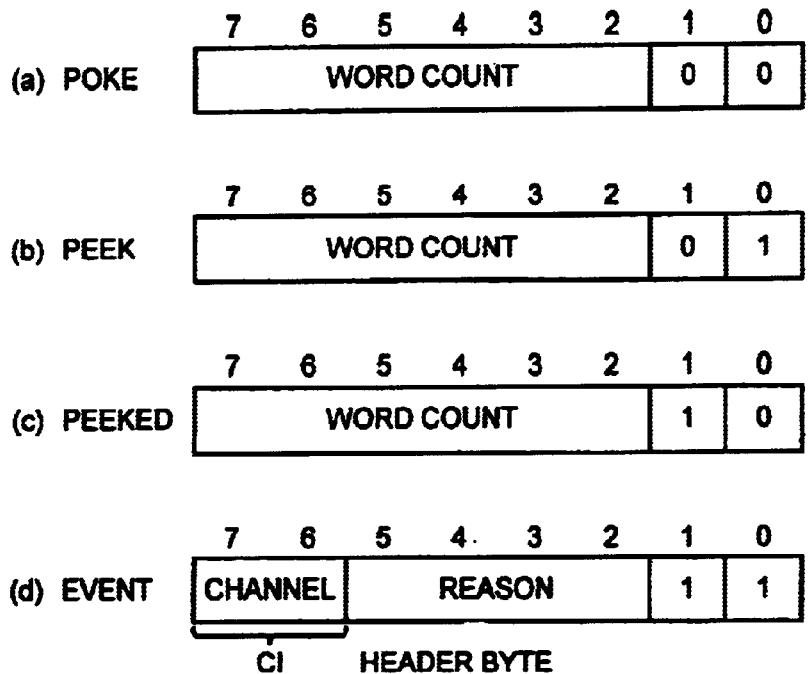
FIG. 6 illustrates the format of header bytes of messages according to the described embodiment.

In the described embodiment, there are two types of messages that may be initiated, and two types of messages which may be generated as responses. The two types of messages which may be initiated are a memory write request for writing specified data to a specified memory location, termed a "poke" and a memory read request for reading data from a specified memory location, termed a "peek". The two types of messages which may be generated as responses are a "peeked" message responding to a memory read request to return the read data and an "event" message, to be described later. The first byte of each message will be a header byte, the structure of which for each of the four messages is illustrated in FIG. 6. The header byte constitutes a packet identifier to identify the nature of the packet.

Figure 7:
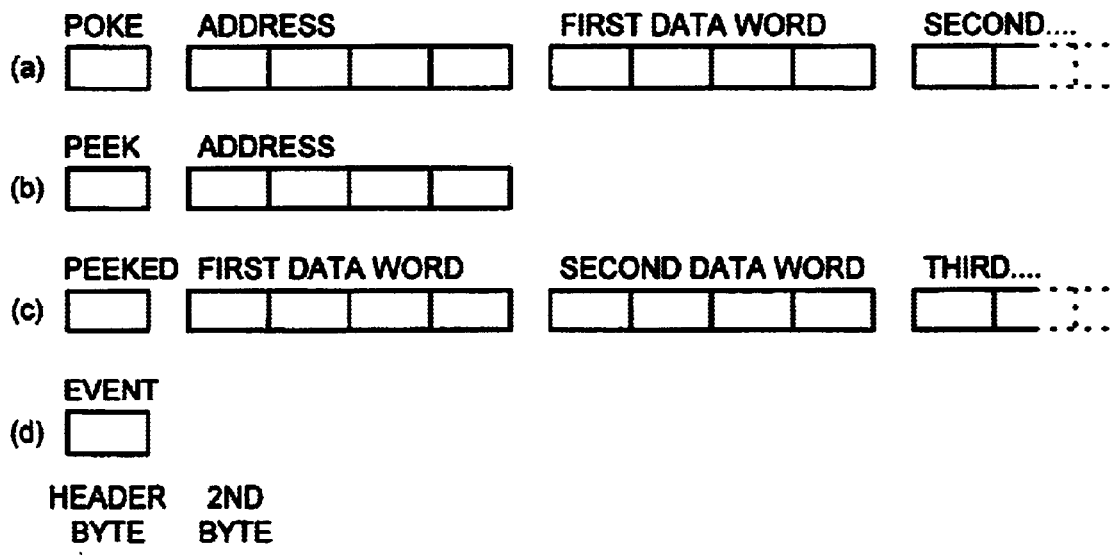
FIG. 7 illustrates the format of messages according to the described embodiments.

The first two bits of a header byte constitute a type identifier to identify the type of message, i e. whether the message is a poke, a peek, a peeked, or an event message. For poke, peek and peeked messages, the following six bits of the header byte act as a length indicator to identify the number of words following the header byte and associated with that message, thus indicating the length of the packet. In an event message, four bits provide a reason indicator and two bits define a channel identifier (CI). FIG. 7 illustrates the structure of each of four types of message according to the described embodiment. FIG. 7*a* shows a poke message as comprising a poke header byte 00+WORDCOUNT, followed by an address word, and followed by at least one data word. FIG. 7*b* shows a peek message as comprising a peek header byte 01+WORDCOUNT followed by an address word. FIG. 7*c* shows a peeked message as comprising a peeked header byte 10+WORDCOUNT followed by at least one data word. FIG. 7d shows an event message as comprising an event header byte only, 11+CI+REASON. The operation of the three memory access messages is discussed only briefly herein because they are described in more detail in our earlier Application EP-A-840218. The event message is discussed in the following.

The two channel identifier bits CI identify the channel on which communication is to be established on-chip. The reason code identified by the remaining four bits applies to the indicated channel. Any event message, and all following non-event messages, if any, apply to the identified channel. The initial state is channel 0, so that an initial event message is not required and the default communication, in both directions, is channel 0. An event message which changes channels is allowed to occur between a peek and its corresponding peeked message, as illustrated for example in FIG. 8 and described in more detail hereinafter.

Operation of the receive demultiplexor 208 and transmit multiplexor 210 can now be described.

On receipt of a message on RXDATA 94 by the receive demultiplexor 208, the byte counter 214 is loaded with the number of bytes expected for each message computed from the word count extracted from the header of each message. The byte count is decremented as each byte within the message passes through. When the byte count is zero, then the next byte is a header. The event detector 212 looks at each byte and decodes the channel identifier. The receive state machine 220 observes the output from the byte counter 214 and the event detector 212 and determines from the channel identifier the channel (i.e. channel 0 or channel 1) for this and subsequent messages. According to the Identified channel, it controls passage of the message either to the first receive buffer 216 or the second receive buffer 218 and connects the control signals 100,102 with the control signals of the appropriate channel. Thus, if the channel identifier or channel number denotes channel 0, then the control signals 100,102 are connected to lines 228 and 222 respectively. The message is placed into the first receive buffer 216 and output via data path 230 for communication via channel 0.

The transmit multiplexor passes the channel stream data from whichever channel is communicating to the transmit stream TXDATA 92 and connects together the corresponding control signals. It also inserts an event packet when the communicating channel changes. If both channels have data available for transmission, the messages from each are sent alternately.

The byte counter 238 is loaded with the number of bytes expected for each message computed from the word count extracted from the header of each message. The byte counter is decremented as each byte within the message passes through. When the byte counter 238 is zero, then the next byte is a header. The transmit state machine 244 connects the control signals of the communicating channel with the transmit control signals 96,98. Thus, for example, if channel 0 is communicating, the signal 250 is connected to the control signal 96 and the signal 246 is connected to the control signal 98 by the transmit state machine 244. The transmit state machine 244 also determines when there is to be a change in communicating channel. To effect that change, it switches over connection of the control signals to the control signals of the other channel (or another channel if there are more than two communicating channels) and triggers the event generator 242 to generate an event packet identifying the channel to which communication has just been switched. That event packet identifies the channel in the CI bits 6 and 7 in FIG. 6(*d*), and identifies as a reason in bits 2 to 5 that there has been a channel change. The generated event packet is launched via the transmit data path 92 after all bytes of the message currently being conveyed on the first communicating channel have been conveyed. This is determined by the byte counter 238.

Figure 8:
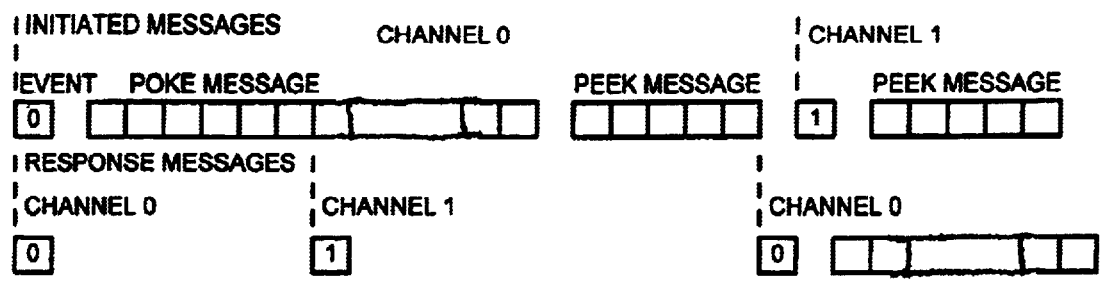
FIG. 8 illustrates interleaving of messages to change channels.

This is illustrated in FIG. 8, where the event packet is denoted as a rectangle with a zero or one inside it. A zero indicates that the channel identification bits denote channel zero, and a one indicates that the channel identification bits denote channel 1. Thus, for messages initiated on-chip and transmitted off-chip, an event packet defining channel 0 is first launched, followed by a poke message and a peek message all communicated via channel 0. Then, the communicating channel is switched to channel 1 and this is indicated by an event packet denoting channel 1. This is followed by a peek message on channel 1. It will readily be apparent that the messages which follow the channel changing event message are exemplary only.

A sequence of response messages is also shown in FIG. 8.

FIG. 10 illustrates in schematic form one arrangement which makes use of the multi-core data adaptor 202 to establish a connection between independent debugger hosts and independent on-chip processing cores. In FIG. 10, reference numerals 300 and 300' denotes independent host CPUs, each with their own communications port for transmitting messages via a communication channel 306 such as Ethernet. Reference numeral 308 denotes an off-chip adaptor circuit which includes the necessary circuitry for converting data received via the TAP controller 4 into messages in a format comprehensible by the host CPUs. Such circuitry is described in more detail in our earlier European Application EP-A-0840217. The adaptor circuit 308 generates the TAP controller signals 14,16,18 and 22 defined above with respect to FIG. 1 and receives the output signal 20. The Integrated circuit comprises two independent processing cores 310,310'. Each processing core comprises a message converter 160,160', diagnostic facilities 163,163', a target CPU 162,162', and on-chip memory 164,164'. These blocks are all interconnected by a bus system (shown dotted) which can communicate with the respective channel in communication with the particular processing core. In addition, the bus system for each processing core can be connected to off-chip memory 174,174' by an off-chip connection 316, 316' respectively.

The message converter operates to decode and encode messages for transmission from and to the communication channel, for off-chip communication and for the processing core. Its operation is described in more detail in our earlier application EP-A-0840218 (PWF Ref. 85515). The diagnostics facilities 163 can include diagnostic registers which can be read to or written from via a diagnostic bus 312. Control information associated with the target CPU 162 (or 162') is read from the diagnostic facilities 300. The instruction pointer and other control signals associated with each target CPU are stored in the diagnostic registers of the respective diagnostic facilities. The instruction pointer is continually copied into one of the diagnostic registers and can be accessed by a request on the diagnostic bus. To look at the status of the target CPU in each processing core, it is necessary to look at one of the diagnostic registers of the diagnostic facilities within that processing core. The diagnostic registers can store various control signals of the target CPU, for example, STORE, TRAP, TAKEATRAP, TRAPATNEXTEXIT. Likewise, each host CPU may write to registers within the diagnostic facilities via the diagnostic bus 312 (or 312'). Each host CPU 300,300' can communication independently with each processing core 310,310' via the respective channels 206,204. For each case, in response to the host CPU writing to the registers of the diagnostic facilities, triggered events may occur. Such triggered events are detected in the message converter which generates a suitable header byte to transmit an event message off-chip.

The target CPU can itself access the diagnostic facilities and in doing so this may cause a triggered event to occur which is translated into a message at the message converter 160 (or 160') and is returned on the appropriate channel to the multi-core date adaptor 202. The multi-core data adaptor ensures that the message is transmitted off-chip and reaches the appropriate host CPU by virtue of the channel identifier.

Thus, the arrangement of FIG. 10 allows independent debugging operations to be carried out between each host CPU 300 and 300' and a respective independent processing core 310,310' by virtue of the independent communication channels 206,204.

FIG. 11 illustrates another environment in which the multi-core data adaptor 202 can be used. The on-chip facilities are as already described with reference to FIG. 10, as is the off-chip communications adaptor 308. In this system however there is a single host CPU 300 with a communications port connected to an Ethernet connection 306. The host CPU comprises an operating system 400 capable of running two independent debugger applications 402,402' for debugging respectively the independent processing cores 310,310' on-chip. In this case, channel 0, 206, can be defined to allow communication between the debugger application 402 and the on-chip processing core 310, while channel 1, 204, can be defined to allow communication between the debugger application 402' and the processing core 310'.

FIG. 12 illustrates yet another environment in which the multi-core data adaptor 202 can be used. On-chip facilities are as described with reference to FIG. 10, as is the. off-chip communications adaptor 308. As with FIG. 11, there is a single host CPU 300 with a communications port connected to an Ethernet connection 306. The CPU has an operating system 400 which interfaces with a debugger application 404 with respective interface modules 406,406'. In this particular case, the communication channels 206,204 allow respective independent communication between each interface module 406,406' and its respective on-chip processing core 310,310'.

The systems described herein allow the following diagnostic features to be provided independently between each off-chip debugger application and each on-chip processing core:

the facility to implement real time diagnostic procedures, that is while the target CPU is operating in real time and without intruding on its operation while the diagnostic procedures are taking place—in particular, monitoring of the memory bus and accesses to the target memory can be undertaken by the host CPU without involving the target CPU of that on-chip processing core;

accesses to target memory and configuration registers from hosts;

access to host memory from target;

control of target CPU and sub-systems, including the facility to effect booting operations of the CPU from the host processor.

It is also mentioned herein that the error detection technique identified in our earlier GB Application No. 9810512.5 can be used in this context.

What is claimed is:
1. An integrated circuit comprising:
   a) a serial data input pin and a serial data output pin;
   b) on-chip functional circuitry comprising at least two processing cores, each processing core associated with a respective communication channel;
   c) a data adaptor that is in communication with the processing cores by the respective communication channels and is connectable to the input and output pins, the data adaptor comprising:
      i) transmit circuitry including circuitry for receiving parallel data and control signals from said on-chip functional circuitry;
      ii) circuitry for converting said parallel data and control signals into a sequence of serial bits including flow control bits, data bits and channel identification bits that identify the communication channel on which said parallel data and control signals were received;
      iii) receive circuitry including circuitry for receiving from off-chip via the serial data input pin a sequence of serial bits including flow control bits, data bits and channel identification bits;
      iv) circuitry for converting said sequence into parallel data and control signals for said on-chip functional circuitry; and
      v) circuitry for transmitting said parallel data and control signals on the communication channel identified by said channel identification bits.

2. The integrated circuit of claim 1 wherein the receive circuitry comprises a decoder for decoding an event sequence of said serial bits, said event sequence including said channel identification bits.

3. The integrated circuit of claim 1 wherein the transmit circuitry includes an event generator which generates an event sequence of bits to identify the communication channel on which data is being transmitted.

4. The integrated circuit of claim 3 wherein the event generator is only operable to generate an event sequence when the instant communication channel is switched to an alternative communication channel.

5. The integrated circuit of claim 1 wherein each processing core includes at least one autonomously operating processor.

6. The integrated circuit of claim 1 wherein each processing core includes a message converter which formulates messages to be transmitted off-chip via the data adaptor and decodes messages which are received on-chip via the data adaptor.

7. The integrated circuit of claim 1 wherein each processing core includes on-chip memory.

8. The integrated circuit of claim 1 wherein each processing core includes a bus system for communicating with off-chip memory.

9. The integrated circuit of claim 1 wherein each processing core comprises a set of registers holding information for diagnostic purposes, said registers being accessible from off-chip via the data adaptor and the communication channel associated with that processing core.

10. The integrated circuit of claim 1 which further comprises a test access port controller connected to effect communication of serial data across the chip boundary via said input and output pins, the test access port controller being connectable to on-chip test logic in a first mode of operation and connectable to the data adaptor in a second mode of operation.

11. A computer system comprising:
   a) a serial data input pin and a serial data output pin;

17 b) on-chip functional circuitry comprising at least two processing cores;
c) a data adaptor which is in communication with the processing cores by respective communication channels and is connectable to the input and output pins, the data adaptor comprising:
   i) transmit circuitry including circuitry for receiving parallel data and control signals from said on-chip functional circuitry;
   ii) circuitry for converting said parallel data and control signals into a sequence of serial bits including flow control bits, data bits and channel identification bits which identify the communication channel on which said parallel data and control signals were received;
   iii) receive circuitry including circuitry for receiving from off-chip via the serial data input pin a sequence of serial bits including flow control bits, data bits and channel identification bits;
   iv) circuitry for converting said sequence into parallel data and control signals for said on-chip functional circuitry; and
   v) circuitry for transmitting said parallel data and control signals on the communication channel identified by said channel identification bits;
(d) at least two independently operating off-chip processors; and
(e) an off-chip host communications adaptor connected to the off-chip processors and configured to convert parallel data and control signals from the off-chip processors into a sequence of serial bits for communicating on-chip.

12. A computer system comprising:
a) a serial data input pin and a serial data output pin;
b) on-chip functional circuitry comprising at least two processing cores;
c) a data adaptor which is in communication with the processing cores by respective communication channels and is connectable to the input and output pins, the data adaptor comprising:
   i) transmit circuitry including circuitry for receiving parallel data and control signals from said on-chip functional circuitry;
   ii) circuitry for converting said parallel data and control signals into a sequence of serial bits including flow control bits, data bits and channel identification bits which identify the communication channel on which said parallel data and control signals were received;
   iii) receive circuitry including circuitry for receiving from off-chip via the serial data input pin a sequence of serial bits including flow control bits, data bits and channel identification bits;
   iv) circuitry for converting said sequence into parallel data and control signals for said on-chip functional circuitry; and
   v) circuitry for transmitting said parallel data and control signals on the communication channel identified by said channel identification bits;
(d) an off-chip host processor operating independently of at least two debugging applications; and
(e) an off-chip host communications adaptor connected to receive messages from the host processor and to convert said messages from a form of parallel data and control signals into a sequence of serial bits for communicating on-chip.

13. A computer system comprising:
a) a serial data input pin and a serial data output pin;

18 b) on-chip functional circuitry comprising at least two processing cores;
c) a data adaptor which is in communication with the processing cores by respective communication channels and is connectable to the input and output pins, the data adaptor comprising:
   i) transmit circuitry including circuitry for receiving parallel data and control signals from said on-chip functional circuitry;
   ii) circuitry for converting said parallel data and control signals into a sequence of serial bits including flow control bits, data bits and channel identification bits which identify the communication channel on which said parallel data and control signals were received;
   iii) receive circuitry including circuitry for receiving from off-chip via the serial data input pin a sequence of serial bits including flow control bits, data bits and channel identification bits;
   iv) circuitry for converting said sequence into parallel data and control signals for said on-chip functional circuitry; and
   v) circuitry for transmitting said parallel data and control signals on the communication channel identified by said channel identification bit;
(d) an off-chip host processor operating a debugging application with independently operable interface modules; and
(e) a host communications adaptor connected to the host processor and operable to convert messages in a form of parallel data and control signals into a sequence of serial bits for communication on-chip.

14. A method of effecting communication of messages from one of a plurality of independent processing cores on an integrated circuit to an off-chip host processor, each of the processing cores associated with a respective communication channel, wherein:
a) said one independent processing core formulates a message including a message identifier denoting the nature of the message and a channel identifier denoting the communication channel by which the independent processing core seeks to communicate the message;
b) the message is communicated via the identified communication channel to a data adaptor that adapts the message into a format suitable for communication off-chip;
c) when an alternative independent processing core seeks to communicate a message, a new communication channel is identified for the alternative independent processing core and an event message is generated for transmission off-chip identifying the alternative communication channel.

15. The method according to claim 14, wherein when a message is received on-chip, its channel identifier is decoded and the message is conveyed to the communication channel identified by the channel identifier so that the message is transmitted to a correct one of the independent processing cores.

16. An integrated circuit, comprising:
a plurality of independent processing cores, each independent processing core configured to formulate a first message that includes a first message identifier denoting the nature of the first message and a channel identifier denoting a first communication channel by which the independent processing core seeks to communicate the first message off-chip;
a data adaptor coupled to the plurality of independent processing cores, the data adaptor configured to receive the first message via the identified first communication channel and to adapt the message for communication off-chip, the data adaptor further configured to receive a second message from a second independent processing core denoting a second communication channel and to generate an event message for transmission off-chip identifying the second communication channel.

17. The circuit of claim 16 wherein the data adaptor is further configured to receive an off-chip message and decode the off-chip message for transmission via a communication channel identified by the channel identifier for receipt by one of the plurality of independent processing cores.

18. The circuit of claim 17 wherein the data adaptor is further configured to receive parallel and serial data and to convert the same to serial and parallel data, respectively.

19. The circuit of claim 18, further comprising diagnostic registers associated with each of the plurality of independent processing cores and configured to be accessible from off-chip via the data adaptor.

20. The circuit of claim 18, further comprising a test access port controller configured to effect communication of serial data across a circuit boundary via input and output pins, the test access port controller being connectable to test logic in the integrated circuit in a first mode of operation and connectable to the data adaptor in a second mode of operation.

21. An integrated circuit comprising:
a) a serial data input pin and a serial data output pin;
b) on-chip functional circuitry comprising at least two processing cores;
c) a data adaptor which is in communication with the processing cores by respective communication channels and is connectable to the input and output pins, wherein the data adaptor comprises:
   i) transmit circuitry including circuitry for receiving parallel data and control signals from said on-chip functional circuitry;
   ii) circuitry for converting said parallel data and control signals into a sequence of serial bits including flow control bits, data bits and channel identification bits which identify the communication channel on which said parallel data and control signals were received;
   iii) receive circuitry including circuitry for receiving from off-chip via the serial data input pin a sequence of serial bits including flow control bits, data bits and channel identification bits;
   iv) circuitry for converting said sequence into parallel data and control signals for said on-chip functional circuitry; and
   v) circuitry for transmitting said parallel data and control signals on the communication channel identification by said channel identification bit;
      wherein the receive circuitry comprises a decoder for decoding an event sequence of said serial bits, said event sequence including said channel identification bits;
      wherein the event generator is only operable to generate an event sequence when the instant communication channel is switched to an alternative communication channel.

22. An integrated circuit comprising:
a) a serial data input pin and a serial data output pin;
b) on-chip functional circuitry comprising at least two processing cores;
c) a data adaptor which is in communication with the processing cores by respective communication channels and is connectable to the input and output pins, wherein the data adaptor comprises:
   i) transmit circuitry including circuitry for receiving parallel data and control signals from said on-chip functional circuitry;
   ii) circuitry for converting said parallel data and control signals into a sequence of serial bits including flow control bits, data bits and channel identification bits which identify the communication channel on which said parallel data and control signals were received;
   iii) receive circuitry including circuitry for receiving from off-chip via the serial data input pin a sequence of serial bits including flow control bits, data bits and channel identification bits;
   iv) circuitry for converting said sequence into parallel data and control signals for said on-chip functional circuitry; and
   v) circuitry for transmitting said parallel data and control signals on the communication channel identification by said channel identification bit, under control of the flow control bits.

23. The circuit of claim 22, wherein the data adapter is configured to respond to start and stop bits in the flow control bits to only enable the flow of serial bits when capacity is available to receive the flow of serial bits.

* * * * *